No. 729,689. Patented June 2, 1903.

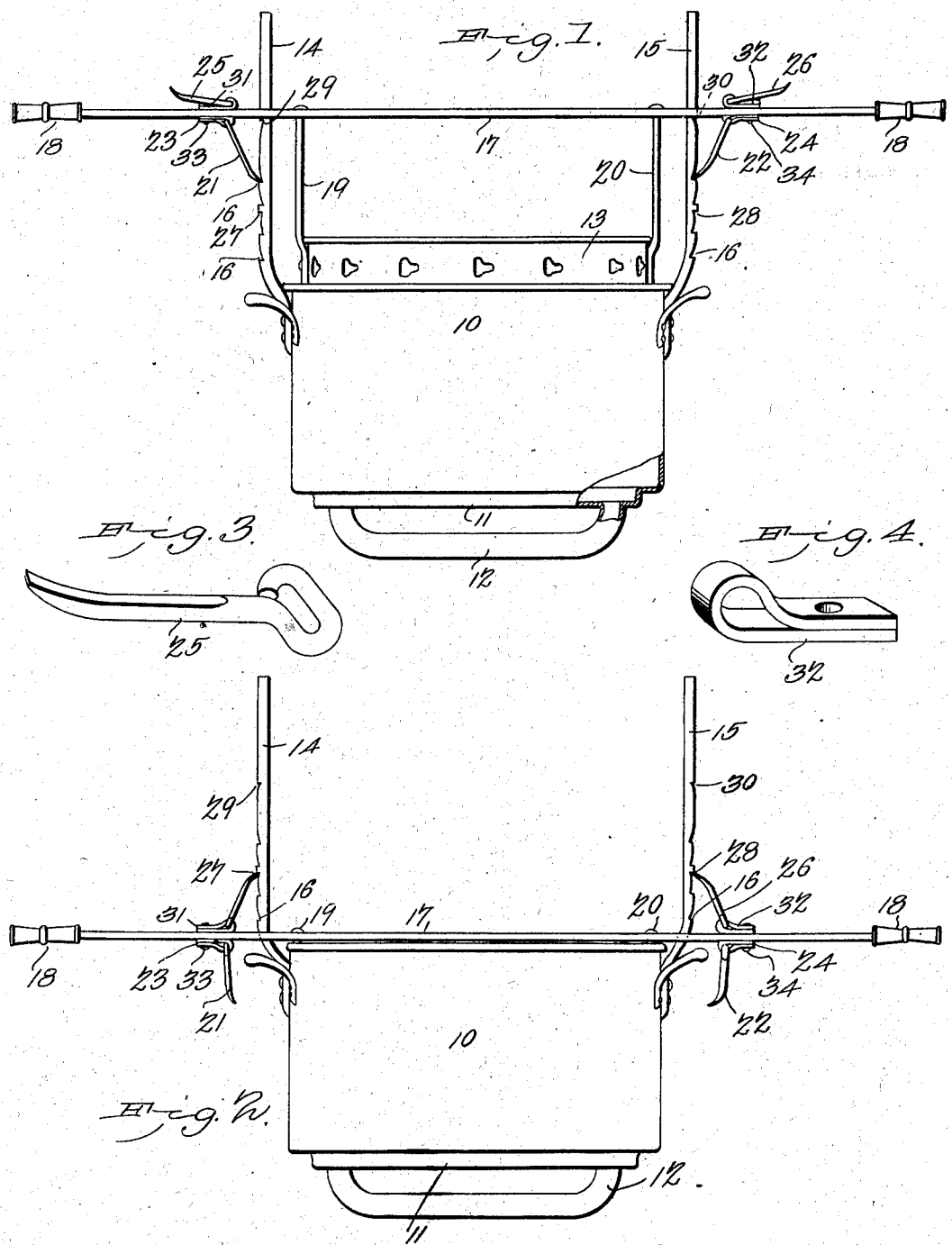

UNITED STATES PATENT OFFICE.

WILLIE SMITH, OF ALBERTVILLE, ALABAMA.

CANNING APPARATUS.

SPECIFICATION forming part of Letters Patent No. 729,689, dated June 2, 1903.

Application filed November 24, 1902. Serial No. 132,608. (No model.)

*To all whom it may concern:*

Be it known that I, WILLIE SMITH, a citizen of the United States, residing at Albertville, in the county of Marshall and State of Alabama, have invented a new and useful Canning Apparatus, of which the following is a specification.

This invention relates to devices employed for steaming and canning fruits, vegetables, and the like, and has for its object the construction and arrangement of a simple, easily operated and applied apparatus whereby the fruit, vegetables, or other products inclosed in the jars or cans may be supported adjustably in the steam or hot water and the can-receptacle transported from place to place independently of or connected to the vessel inclosing the water and steam; and the invention consists in certain novel features of the construction, as hereinafter shown and described, and specified in the claims.

In the drawings illustrative of the invention, in which corresponding designating characters are employed for like parts in all the figures, Figure 1 is a side elevation of the canning apparatus with the can-receptacle elevated, and Fig. 2 is a similar view with the can-receptacle lowered. Fig. 3 is an enlarged perspective view of one of the supporting-pawls detached; and Fig. 4 is a perspective view, enlarged, of one of the pawl-clips detached.

The vessel inclosing the hot water and steam is indicated at 10 and may be of any size or shape, but will preferably be of a form similar to an ordinary washboiler, and in practice it has been found convenient to employ an ordinary washboiler for this purpose; but I do not wish to be limited in any manner to the size or form of the vessel 10. The vessel 10 will preferably be arranged with a depressed lower portion 11, adapted to fit the stove when the adjacent griddles and the division-bar between them are detached, as is usually done when a washboiler is employed upon a stove. Connected into the depressed portion 11, adjacent to its ends, are pipes 12, any desired number being employed. The pipes 12 are turned upwardly at the ends and connected through the portion 11 so that the pipes depend beneath the vessel and are spaced therefrom and connected thereto at the ends, so that the water will freely circulate therethrough. By this arrangement when the vessel is placed upon the stove the pipes 12 will project downward for a considerable distance into the fire-chamber and close to or partially embedded in the fuel therein. By this means the effect of the heat upon the water in the vessel will be materially increased and the temperature raised very quickly to a high degree and the circulation of the water materially accelerated.

The receptacle for the cans, jars, or other closures for the fruit or vegetables may be constructed in any desired form, but will preferably be in the form of an open cage or perforated support and may be made in any desired manner, and I do not wish to be limited to any specific form for this portion of the apparatus. It will generally be formed similar in shape to the vessel 10, with just sufficient clearness to enable it to be moved vertically therein. For the purpose of illustration the receptacle is shown in the form of a framework 13, suitably perforated.

Rising from the vessel 10 are standards 14 15, provided with spaced notches 16, and movably engaging these standards is a bar 17, extended laterally in opposite directions and provided with handles 18 upon its opposite ends. The receptacle 13 is suspended from this bar 17, as by rods 19 20, the bar 17 thus forming a carrying-bar by which the receptacle 13 may be transported. The bar 17 will be perforated to permit the passage of the standards 14 15, and by this arrangement the carrying-bar may be lifted free from the standards and the receptacle 13 transported independently of the vessel 10 when it is desirable to do so.

Attached to the bar 17 are pawls 21 22, adapted to be engaged detachably with the notches 16, and thus support the bar 17 and its connected receptacle 13 at any desired point of elevation relative to the vessel 10, as shown in Fig. 1, which represents the receptacle 13 in its elevated position, and it will be obvious that by employing a plurality of the notches 16 the receptacle 13 will be adjusted to any desired height within the range of the notches. The pawls 21 will be connected movably to the bar 17 by clips 23 24, so that the pawls may be readily disengaged from the standards, as shown in Fig. 2. The pawls 21 22 will be connected to the lower side of the bar 17, and similarly connected to the upper side of the bar are pawls 25 26, adapted to engage reversed notches 27 28 upon the standards when the bar is in its lowermost position, as shown in Fig. 2, preventing longitudinal separating movement between the bar and standard, and thus transforming the bar into a carrying means for the whole device, with the receptacle 13 in its lowermost position. The standards 14 15 will be provided with reversely-disposed notches 29 30 relatively near their upper ends and adapted to receive the pawls 25 26, and thus support the bar 17 relatively near the upper portion of the standards to enable the device to be transported with the receptacle 13 in an elevated position relative to the vessel 10.

It is obvious that by increasing the number of the notches in the standards and adapting them to be actuated by the pawls both above and below the bar the receptacle 13 may be supported at any desired point of elevation relative to the vessel 10 and the two members transported by the handle-bar to any desired point. By this means the jars or cans of the fruit or vegetables will be supported in the receptacle 13 and immersed to any desired extent in the liquid in the vessel 10 and adjusted to any point of elevation or lifted entirely free from the liquid in the vessel or supported above the liquid to permit the proper drainage or detached bodily from the vessel, as may be desired.

The device thus makes a very convenient, simply-constructed, and easily-operated apparatus for the purposes designed, which may be readily employed in connection with an ordinary cooking-stove and will be found very convenient and useful for the purposes intended.

While the device is described for use more particularly for canning purposes, it may be employed for other purposes, and I do not, therefore, wish to be limited in the use of the device for any specific purpose, but reserve the right to its use for any purpose for which it is adapted.

The clips by which the upper pawls 25 26 are connected to the bar 17 are denoted at 31 32 and are precisely like the clips 23 24, by which the pawls 21 22 are secured, and will be located directly opposite the clips 23 24, so that the same rivets 33 34 which secure the clips 23 24 will also secure the clips 31 32, as shown.

Having thus described the invention, what is claimed is—

1. In a canning apparatus, an inclosing vessel, an inner vessel, pairs of oppositely-operating pawls carried by one of the vessels, and a member carried by the other vessel and provided with oppositely-located notches for engagement by the pawls.

2. In a canning apparatus, an inclosing vessel, an inner vessel, a carrying-bar having pairs of oppositely-operating pawls secured to one of the vessels, and standards carried by the other vessel and provided with oppositely-located notches for engagement with the pawls.

3. In a canning apparatus, an inclosing vessel having vertical standards provided with spaced transverse notches, a carrying-bar having spaced perforations movably engaging said standards, pawls movably connected to said bar and adapted to successively engage said notches and lock said bar in position relative to said standards, and a receptacle for the cans supported from said bar, substantially as described.

4. In a canning apparatus, an inclosing vessel having notched standards, a carrying-bar movably engaging said standards, a receptacle for the cans supported from said bar, pawls movably connected to said bar and successively engaging said notches and supporting said can-receptacle in position relative to said bar, and pawls connected to said bar and operating to prevent longitudinal movement between said bar and standards, substantially as described.

5. In a canning apparatus, an inclosing vessel having vertical notched standards, a carrying-bar movably engaging said standards, a can-receptacle supported from said bar, pawls movably connected to said bar and operating upon said standards from one side of said bar, and pawls movably connected to said bar and operating upon said standards from the opposite side of said bar, substantially as described.

6. In a canning apparatus, an inclosing vessel having vertical notched standards, a carrying-bar movably engaging said standards, a receptacle for the cans supported from said bar, pawls disposed upon opposite sides of said bar adjacent to said standards, clips movably connected to each opposite pair of said pawls and connected by one or more rivets to opposite sides of said bar, whereby the pawls may engage the standards from opposite sides of the bar, substantially as described.

In testimony that I claim the foregoing as my own I have hereto affixed my signature in the presence of two witnesses.

WILLIE SMITH.

Witnesses:
T. B. McNaron,
Walter Shipp.